(No Model.)

G. P. WADLEIGH.
REGISTER.

No. 580,476.          Patented Apr. 13, 1897.

WITNESSES:

INVENTOR
George P. Wadleigh
BY Gifford & Bull
ATTORNEYS.

UNITED STATES PATENT OFFICE.

GEORGE P. WADLEIGH, OF JERSEY CITY, NEW JERSEY, ASSIGNOR TO THE KING MANUFACTURING COMPANY, OF NEW JERSEY.

REGISTER.

SPECIFICATION forming part of Letters Patent No. 580,476, dated April 13, 1897.

Application filed May 28, 1896. Serial No. 593,481. (No model.)

*To all whom it may concern:*

Be it known that I, GEORGE P. WADLEIGH, a citizen of the United States, and a resident of Jersey City, in the county of Hudson and State of New Jersey, have invented certain new and useful Improvements in Registers, of which the following is a specification.

My invention relates to registers; and it consists of certain novel parts and combinations of parts particularly pointed out in the claims concluding this specification.

In the accompanying drawings I have shown my invention embodied in the form of a bicycle-cyclometer, but it will be understood that it may be applied to other uses, and also that various modifications and changes in the device may be made without exceeding the scope of the claims and without departing from the spirit of my invention.

Figure 1:
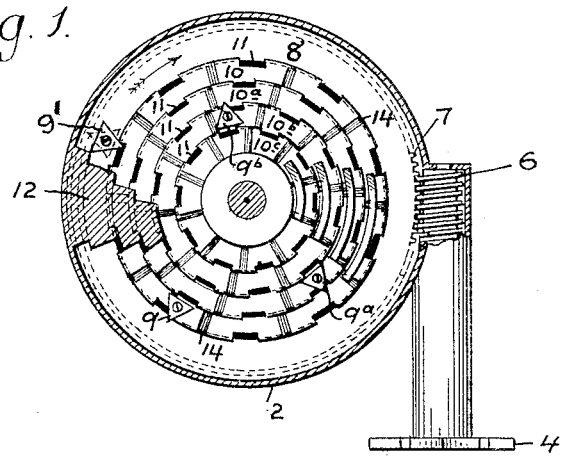
Figure 2:
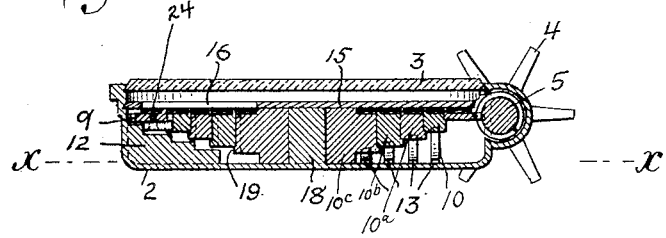

In the accompanying drawings, Figure 1 is a horizontal section through a cyclometer embodied in my invention on the line $x\,x$, Fig. 2; and Fig. 2 is a vertical section through the same.

The following is a description of the cyclometer shown in the said drawings.

2 is the lower section of the case, and 3 a glass plate composing the upper section.

4 is a spur-wheel actuated in the well-known manner by a projection from the wheel of the bicycle to which the cyclometer is attached.

5 is a shaft to which said spur is attached, said shaft being provided with a worm 6, which engages with the teeth 7 on the periphery of the ring 8, which carries a triangular fly 9, mounted to freely revolve on a pivot attached to said ring.

10, $10^a$, $10^b$, and $10^c$ are rings set concentrically, each provided with a series of depressions 11 and each (excepting $10^c$) carrying a triangular fly.

12 is a stationary projection fashioned into steps, as shown in Fig. 2, each step forming a cam-surface projecting in the path of one of the flies 9 9' $9^a$ $9^b$.

Each of the rings 10, $10^a$, $10^b$, and $10^c$ is provided with ten teeth, and the steps 12 are arranged so that each of the flies on the several rings is in engagement with its respective cam-surface during one-tenth of the revolution of its ring.

13 13 13 13 are spring-detents attached to the case and engaging with the depressions 14 on the surface of the rings. Each ring is provided with a series of ten numbers from "0" to "9" on its upper surface. These numbers may be placed on rings of paper 14.

15 is a plate overlying the nest of rings and provided with a slot 16, through which one row of numbers may be seen.

The ring $10^c$ is loosely mounted on stud 18, and the rings $10^b$, $10^c$, $10^a$, 10, and 8 are loosely mounted on each other in the form of a nest. Each is provided with a circumferential projection 19, which holds the nest of rings together when they are removed from the case. The detents 13, being of spring material, not only act as detents to definitely determine the position of the rings with reference to each other, but also act to press them all against the cover 16, which holds them in their proper relative position. This arrangement permits the parts to be fitted with sufficient clearance to avoid injurious friction between them and to prevent the danger of accidentally communicating the motion of one ring to the adjacent ring.

The operation of the device may be thus described: Motion is transmitted from the spur 4, through worm 6, to the ring 8. The fly 9', carried on said ring, normally stands in a position in which it is out of engagement with the teeth on ring 10. When, however, moving in the direction indicated by the arrow this fly comes in contact with the projection 12, it is turned so as to come into engagement with a depression on the ring 10, and as ring 8 continues to revolve ring 10 is caused to move with it until the fly reaches the position shown in Fig. 1, in which it is just about departing from contact with projection 12. As the ring 8 continues to revolve the fly 9' is thrown out of engagement with said tooth, as shown in dotted lines, the further revolution of ring 10 being prevented by the engagement of its detent with one of the depressions 14. By this means the wheel 10 is made to revolve one-tenth of a revolution or one step at each complete revolution of the ring 8. In precisely the same manner the ring $10^a$ is caused to advance one step at every complete revolution of the ring 10, the ring $10^b$ to advance one step at every complete revolution of the ring $10^a$, and the ring $10^c$ to advance one step at every complete revolution of the ring $10^b$.

By such a system of speed-reducing mechanism it will be readily understood that the figures exposed to view through the slot 16 will indicate directly on a plain surface the number of revolutions of the energizing mechanism or the distance which the bicycle has traveled.

From what has been said it will be seen that the essential function of the flies 9 is to intermittently lock adjacent rings for a portion of their revolution and that this result is brought about by the agency of the projections or cam-surfaces 12.

Instead of forming the depressions or teeth on the periphery of the rings they may obviously be formed on their upper or lower surfaces.

In the foregoing specification I have incidentally referred to some of the modifications which might be adopted in the practice of my invention, but I have not endeavored to specify all the modifications which might be employed, the object of this specification being to instruct persons skilled in the art to practice my invention in the form at present preferred by me and to enable them to understand its nature; and I desire it to be distinctly understood that mention by me of a few modifications is in no way intended to exclude others not referred to, but which are within the spirit and scope of my invention.

Many of the details and combinations illustrated and above described are not essential to the several inventions, broadly considered. All this will be indicated in the concluding claims, where the omission of an element or the omission of reference to the detail features of the elements mentioned is intended to be a formal declaration of the fact that the omitted elements or features are not essential to the invention therein severally covered.

Having thus described my invention, embodied in the form which I at present prefer, what I claim is—

1. In a register a plurality of concentric rings provided with depressions or teeth and with freely-revolving flies combined with cams for intermittently causing engagement between adjacent rings.

2. In a register, a plurality of concentric rings, provided with depressions or teeth and with freely-revolving flies combined with a series of projections in the form of steps for intermittently causing engagement between adjacent rings.

GEO. P. WADLEIGH.

Witnesses:
JAMES T. LAW,
FRED S. KEMPER.